United States Patent
Kobayashi

(10) Patent No.: US 11,866,971 B2
(45) Date of Patent: Jan. 9, 2024

(54) HINGE

(71) Applicant: SIMOTEC CO., LTD., Higashiosaka (JP)

(72) Inventor: Shinichi Kobayashi, Higashiosaka (JP)

(73) Assignee: SIMOTEC CO., LTD., Higashiosaka (JP)

( * ) Notice: Subject to any disclaimer, the term of this patent is extended or adjusted under 35 U.S.C. 154(b) by 628 days.

(21) Appl. No.: 16/771,959

(22) PCT Filed: Dec. 11, 2018

(86) PCT No.: PCT/JP2018/045551
§ 371 (c)(1),
(2) Date: Jun. 11, 2020

(87) PCT Pub. No.: WO2019/117163
PCT Pub. Date: Jun. 20, 2019

(65) Prior Publication Data
US 2021/0222471 A1    Jul. 22, 2021

(30) Foreign Application Priority Data
Dec. 13, 2017 (JP) ................. 2017-239036

(51) Int. Cl.
G03G 21/16 (2006.01)
E05D 11/00 (2006.01)
(Continued)

(52) U.S. Cl.
CPC ............ E05D 11/0054 (2013.01); E05D 3/18 (2013.01); E05F 1/1253 (2013.01);
(Continued)

(58) Field of Classification Search
CPC .. E05D 3/10; E05D 3/02; E05D 11/00; G03B 27/62; E05F 1/105; E05F 1/12; E05F 1/1246; G03G 21/16
See application file for complete search history.

(56) References Cited

U.S. PATENT DOCUMENTS 6,456,365 B1 * 9/2002 Hosaka ................... B41J 29/13
399/361
6,926,363 B2   8/2005 Yamashita
(Continued)

FOREIGN PATENT DOCUMENTS

CN    111396446 A  *  7/2020
JP    06063778 U      9/1994
(Continued)

OTHER PUBLICATIONS

JPO Notice of Reasons for Refusal for corresponding JP2017-239036; dated Mar. 8, 2022.
(Continued)

*Primary Examiner* — Emily M Morgan
(74) *Attorney, Agent, or Firm* — CANTOR COLBURN LLP

(57) ABSTRACT

A hinge, wherein, inter alia, intrusion of foreign matter in a contacting portion of a slide member and a cam member and resulting adhesion of an oil provided in the cam member to the foreign matter is reliability prevented from the closed state to the open state of a second wing member. The hinge is provided with an oil fence disposed on the outside close to the contacting portion of the cam member and slide member, the oil fence preventing, from the closed slate to the open state of the second wing member, foreign matter front intruding into the contacting portion of the slide member and cant member from the outside of the slide member and cant member.

2 Claims, 9 Drawing Sheets

(51) Int. Cl.
  *E05D 3/18* (2006.01)
  *E05F 1/12* (2006.01)
  *E05F 3/20* (2006.01)
(52) U.S. Cl.
  CPC ......... *E05D 2011/0072* (2013.01); *E05F 3/20* (2013.01); *E05Y 2201/11* (2013.01); *E05Y 2900/536* (2013.01); *E05Y 2900/606* (2013.01); *E05Y 2900/614* (2013.01); *G03G 21/1623* (2013.01)

(56) References Cited

U.S. PATENT DOCUMENTS

| | | | |
|---|---|---|---|
| 8,973,218 B2 | 3/2015 | Yakuboshi et al. | |
| 2005/0046260 A1 | 3/2005 | Yamashita | |
| 2009/0153833 A1* | 6/2009 | Katsumata | G03B 27/62 355/75 |
| 2014/0201946 A1 | 7/2014 | Yabukoshi et al. | |
| 2022/0127889 A1* | 4/2022 | Ogawa | E05D 11/1014 |

FOREIGN PATENT DOCUMENTS

| | | | |
|---|---|---|---|
| JP | 3044390 | | 12/1997 |
| JP | 2001154287 A | | 6/2001 |
| JP | 2005199087 A | | 7/2005 |
| JP | 2006133532 A | | 5/2006 |
| JP | 2007286630 A | * | 11/2007 |
| JP | 2008257167 A | | 10/2008 |
| JP | 2010060719 A | | 3/2010 |
| JP | 2011133557 A | | 7/2011 |
| JP | 2011191728 A | | 9/2011 |
| JP | 2012234043 A | | 11/2012 |
| JP | 2013020191 A | | 1/2013 |
| JP | 2013164502 A | | 8/2013 |
| JP | 2014069026 A | | 4/2014 |
| JP | 2014137543 A | | 7/2014 |
| JP | 2016138946 A | | 8/2016 |
| JP | 2016223513 A | * | 12/2016 |
| JP | 2017096428 A | | 6/2017 |
| JP | 2017111375 A | | 6/2017 |
| JP | 2020060625 A | * | 4/2020 |
| JP | 2020194121 A | * | 12/2020 |
| JP | 2021189353 A | * | 12/2021 |
| JP | 2022035090 A | * | 3/2022 |
| KR | 20110055453 A | * | 10/2011 |
| KR | 20120086248 A | * | 10/2012 |

OTHER PUBLICATIONS

JPO Notice of Reasons for Refusal for corresponding JP Application No. 2017-239036; dated Oct. 19, 2021.
International Search Report for Corresonding International Application No. PCT/JP2018/045551, dated Mar. 12, 2019.

* cited by examiner

HINGE

CROSS REFERENCE TO RELATED APPLICATIONS

This is the U.S. national stage of application No. PCT/JP2018/045551, filed on Dec. 11, 2018. Priority under 35 U.S.C. § 119(a) and 35 U.S.C. § 365(b) is claimed from Japanese Application No. 2017-239036, filed Dec. 13, 2017, the disclosure of which is also incorporated herein by reference.

TECHNICAL FIELD

The present invention relates to a hinge that openably couples a second to-be-coupled object to a first to-be-coupled object, for example, a hinge that openably couples a document pressing panel of an office machine to the body of the office machine.

BACKGROUND ART

Most conventional office machines that are used in offices such as a copying machine, a facsimile, and a scanner include a document reading part (a contact glass) on the top surface of the body, and a document pressing panel that covers the document reading part. The document pressing panel presses a document, which has been placed on the document reading part, against the document reading part and fixes the position of the document with respect to the document reading part.

As an instrument for coupling the document pressing panel to the body of the office machine, a hinge is known that includes a first wing member, a cam member fastened to the first wing member, a second wing member rotatably coupled to the first wing member with a rotating shaft, a sliding member that moves toward the cam member and away from the cam member, and an energizing member that energizes the sliding member toward the cam member until the sliding member comes into contact with the cam member (see Patent Literature 1).

The hinge may include an oil fence disposed outside the contact parts of the sliding member and the cam member to prevent the adhesion of the oil from the cam member.

CITATIONS LIST

Patent Literature

Patent Literature 1: JP-A 2011-191728 Gazette

SUMMARY OF INVENTION

Technical Problems

In the above hinge, however, the contact parts of the sliding member and the cam member are exposed depending on the rotation angle of the second wing member. Under this condition, a foreign matter from the outside may intrude into an area near the contact parts of the sliding member and the cam member, where the oil may adhere to the foreign matter.

The present invention has been made to solve the above problem. An object of the present invention is to provide a hinge that reliably prevents problems such as the intrusion of a foreign matter into an area near the contact parts of the sliding member and the cam member and the resulting adhesion of the oil from the cam member to the foreign matter, from the closed state to the open state of the second wing member.

Solutions to Problems

The problem to be solved by the present invention is as described above and a mechanism for solving this problem will now be described.

An aspect of the present invention includes: a first wing member fastened to a first to-be-coupled object; a cam member fastened to the first wing member; a second wing member that is fastened to a second to-be-coupled object and rotatably coupled to the first wing member with a rotating shaft, and shifts between an open state and a closed state with respect to the first wing member; a sliding member that is housed in the second wing member and moves toward the cam member and away from the cam member; an energizing member that energizes the sliding member toward the cam member until the sliding member comes into contact with the cam member; and an oil fence that is disposed near and outside contact parts of the cam member and the sliding member, and prevents intrusion of a foreign matter into an area near the contact parts of the sliding member and the cam member from outside of the sliding member and the cam member, from the closed state to the open state of the second wing member.

The oil fence is supported by the sliding member and the cam member and configured to move along with rotation of the second wing member.

The second wing member includes an intermediate member rotatably coupled to the first wing member with a rotating shaft, a fastening member fastened to the second to-be-coupled object and rotatably coupled to the intermediate member with a rotating shaft, and a pressure receiving part fastened to the fastening member. The energizing member energizes the sliding member toward the pressure receiving part until the sliding member comes into contact with the pressure receiving part. A part of the pressure receiving part to be in contact with the sliding member has a continuous curved surface with different curvatures.

Advantageous Effects of Invention

The present invention has the following effects.

The present invention reliably prevents the intrusion of a foreign matter into an area near the contact parts of the sliding member and the cam member and the resulting adhesion of the oil from the cam member to the foreign matter, from the closed state to the open state of the second wing member.

DESCRIPTION OF EMBODIMENT

Figure 1:
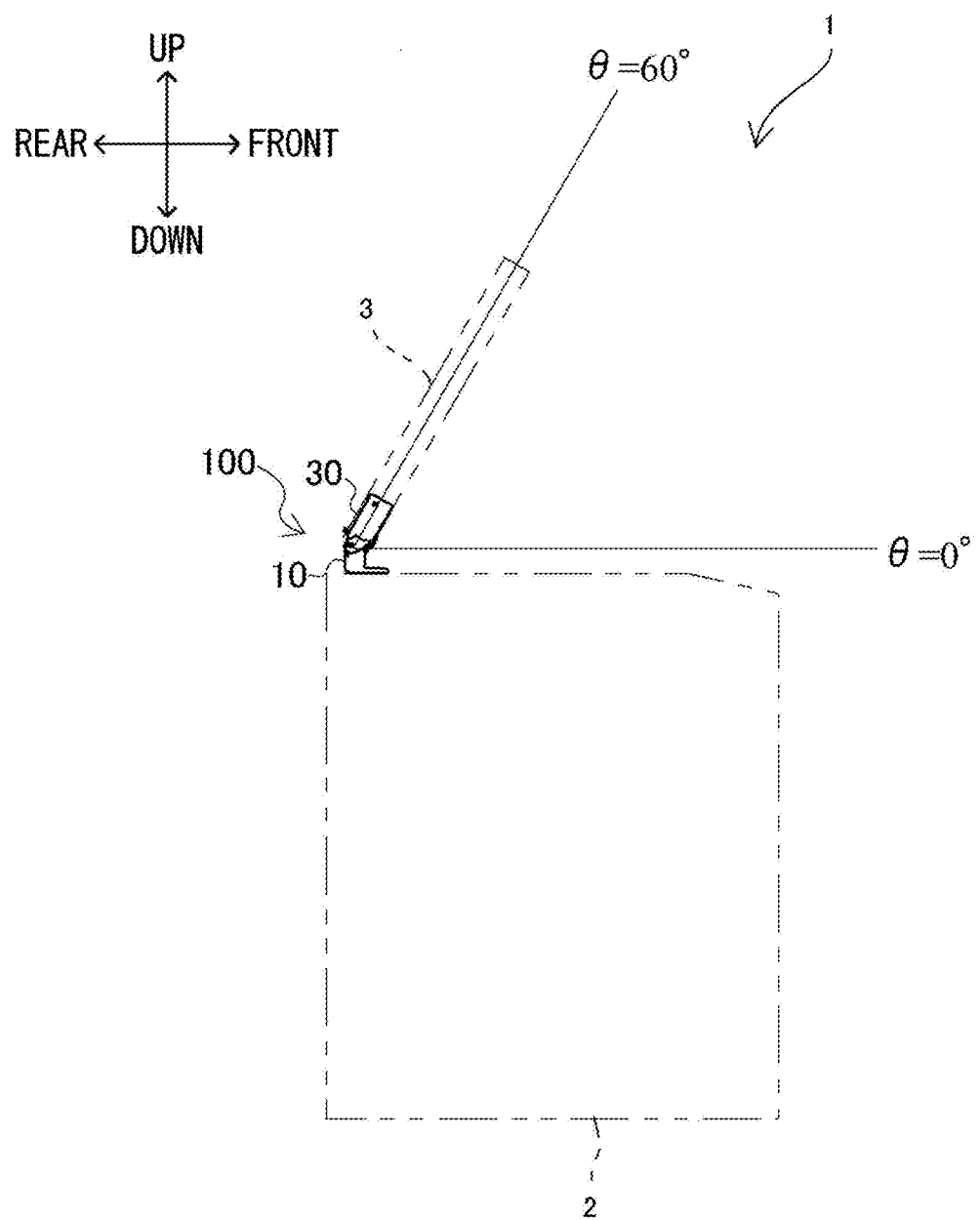
FIG. 1 is a right side view of a multifunctional machine including a hinge according to an embodiment of the present invention.
Figure 2:
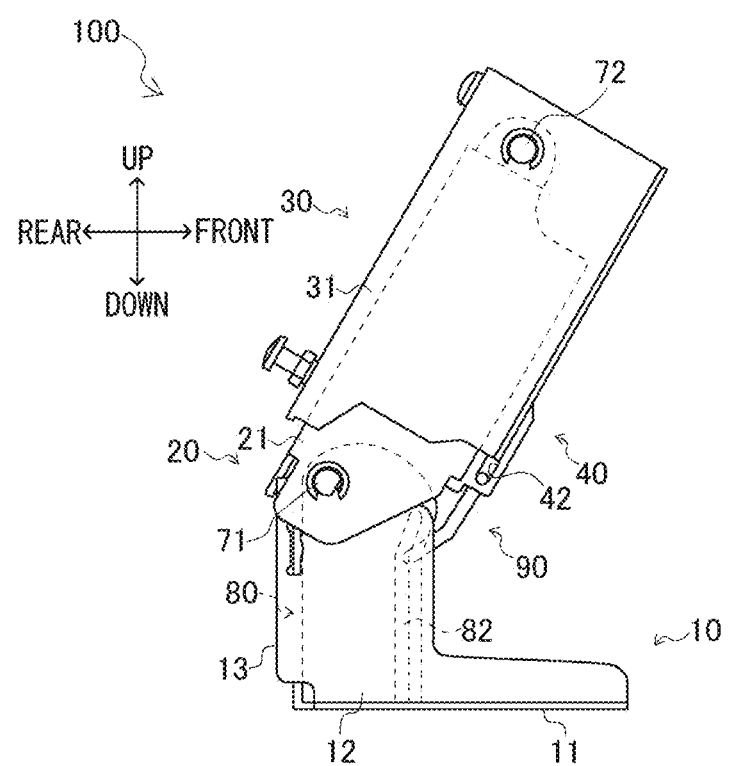
FIG. 2 is a right side view of the hinge in the open state.
Figure 3:
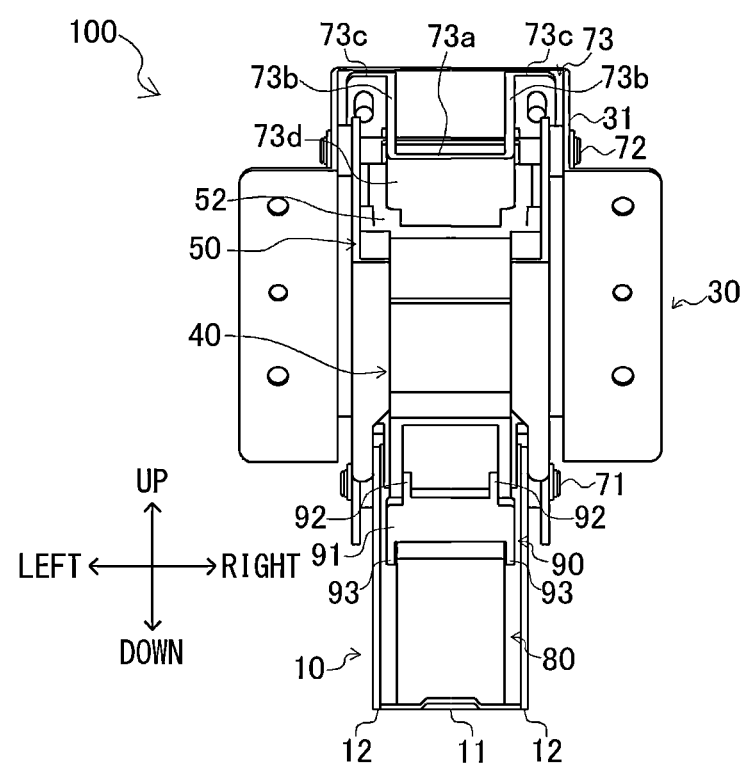
FIG. 3 is a front view of the hinge in the open state.
Figure 4:
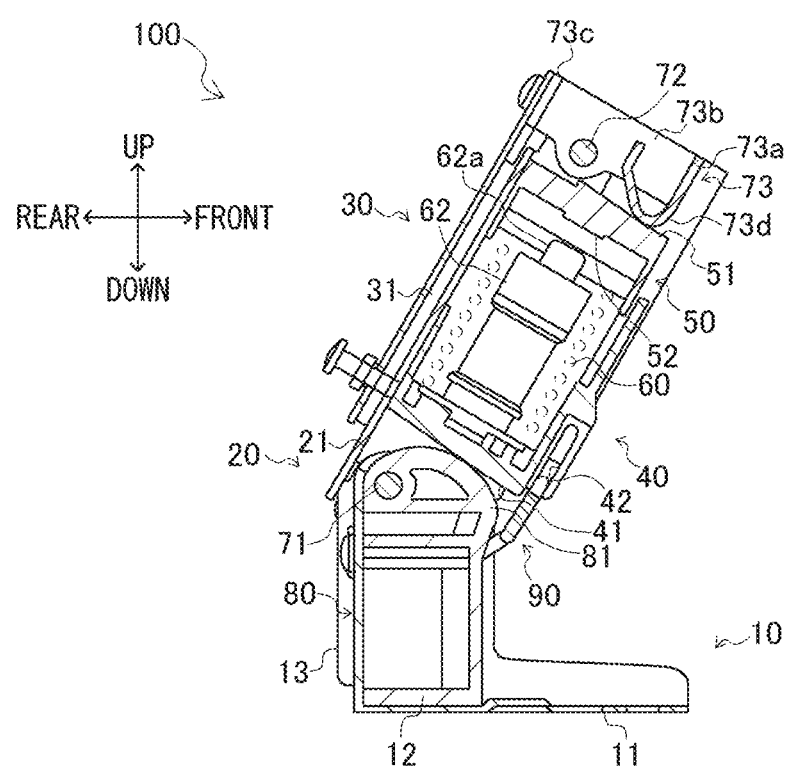
FIG. 4 is a cross-sectional view of the hinge in the open state.
Figure 5:
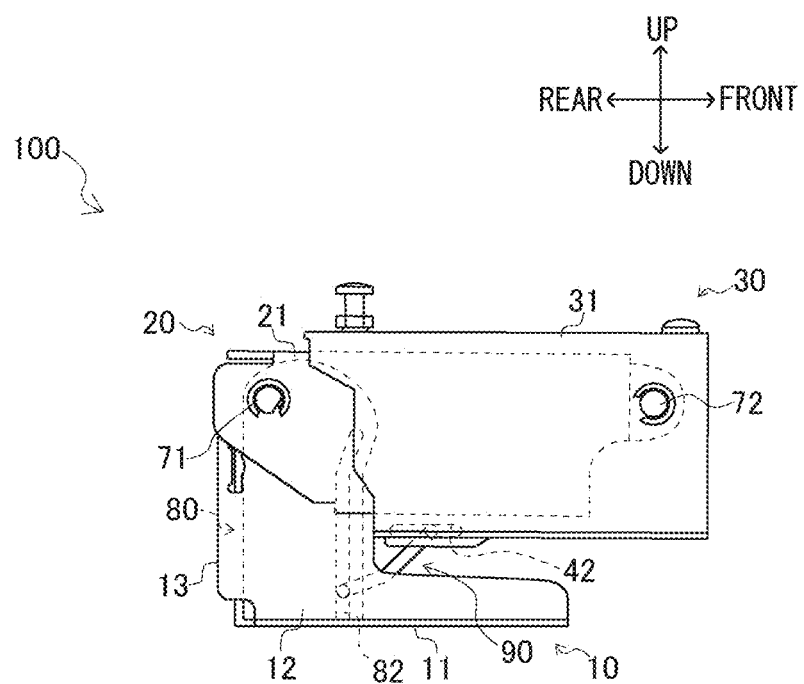
FIG. 5 is a right side view of the hinge in the closed state.
Figure 6:
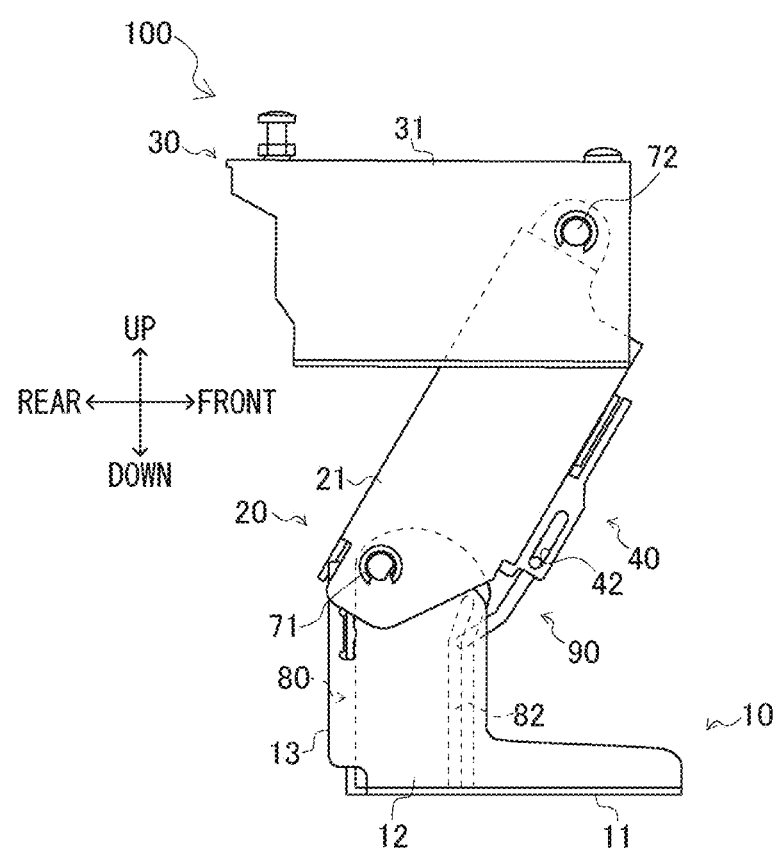
FIG. 6 is a cross-sectional view of the hinge in the open state.
Figure 7:
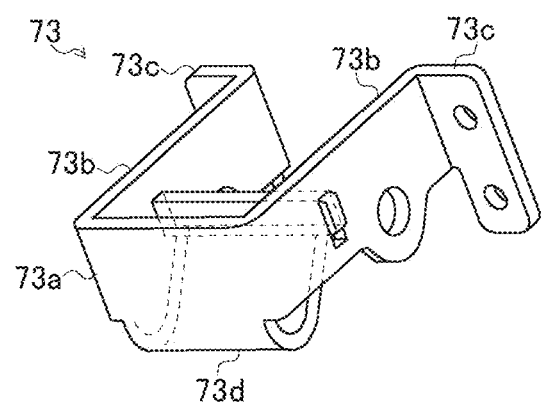
FIG. 7 is a perspective view of a pressure receiving member of the hinge.

With reference to FIG. 1, a multifunctional machine 1 as an embodiment of an office machine will now be described.

The multifunctional machine 1 includes a body 2 and a document pressing panel 3. In this embodiment, the multifunctional machine 1 includes a hinge 100 according to a first embodiment of the present invention, however, the multifunctional machine 1 may include a hinge according to another embodiment described below.

The body 2 is a first to-be-coupled object according to an embodiment of the present invention.

The body 2 includes a document reading device, a control device, a printing device, a display device, and an input device.

The document reading device is disposed on the top surface of the body 2. The document reading device reads a document placed on the top surface of the body 2 (generates image information on the document).

The control device controls the operations of individual parts of the multifunctional machine 1, more specifically, the operations of the document reading device, the printing device described below, and an auto document feeder (ADF) described below.

The control device can store the image information generated by the document reading device and the image information received via a communication line (such as an Internet connection) in connection with the body 2.

The printing device is disposed under the document reading device. The printing device forms a printed image on a predetermined sheet based on the image information stored by the control device.

The display device includes a liquid crystal panel, for example, and displays the information on the operation of the multifunctional machine 1, for example.

The input device includes a button and a switch, which an operator uses to input commands or the like into the multifunctional machine 1. The display device and the input device are disposed on the front part of the top surface of the body 2.

The document pressing panel 3 is a second to-be-coupled object according to an embodiment of the present invention.

The document pressing panel 3 presses a document, which has been placed on the document reading device, against the document reading device to prevent the displacement of the document (the change in the relative position of the document with the document reading device) while the document reading device reads the document.

The document pressing panel 3 includes a pre-read document storage tray, the ADF, and a post-read document storage tray.

The ADF takes one document after another out of a pile of documents in the pre-read document storage tray and places the document at a predetermined reading position on the document reading device. After the document reading device finishes the reading of the document, the ADF transfers the document from the reading position to the post-read document storage tray.

An "office machine" means a machine that at least reads a document (obtains the image information on the document).

Specific examples of the office machine include (a) a scanner that reads a document and sends the image information on the document to another machine (such as a personal computer), (b) a facsimile that reads a document and sends the image information on the document to another machine via a communication line, and prints out the image information received from other machine, (c) a copying machine that reads a document and prints out the image information on the document, and (d) a multifunctional machine that has all the above functions of the scanner, the facsimile, and the copying machine.

The hinge according to each embodiment described in detail below is used for openably (rotatably) coupling the document pressing panel 3 to the body 2 of the multifunctional machine 1, however, the use of the hinge of the present invention is not limited to this.

The hinge of the present invention can widely be applied to "openably coupling one of two members (a second to-be-coupled object) to the other member (a first to-be-coupled object).

Other specific examples of the use of the hinge of the present invention include openably coupling a hatch (a lid) used for replacing a toner cartridge to the body of an office machine, openably coupling a hood to the body of a car, and openably coupling a toilet seat to a toilet bowl.

In the following description, the rotation angle θ of the document pressing panel 3 (more specifically, the rotation angle θ of the document pressing panel 3 with respect to the body 2) is defined as 0° when the document pressing panel 3 is closed (the bottom surface of the document pressing panel 3 is in contact with the top surface of the body 2). As the document pressing panel 3 rotates in the opening direction, the rotation angle θ increases (the rotation angle θ becomes positive) (see FIG. 1). In this embodiment, the rotation angle θ of the document pressing panel 3 with respect to the body 2 corresponds to the angle of rotation of the second wing member from the closed state with respect to the first wing member described below. Thus, both the rotation angles are described as "the rotation angle θ" in this embodiment.

With reference to FIGS. 1 to 10, the hinge 100, which is a hinge according to an embodiment of the present invention, will now be described.

As shown in FIG. 1, the hinge 100 rotatably couples the document pressing panel 3 to the body 2 of the multifunctional machine 1.

As shown in FIGS. 2 to 8, the hinge 100 includes a lower fastening member 10, an intermediate member 20, a first rotating pin 71, an upper fastening member 30, a second rotating pin 72, a pressure receiving part 73, a first slider 40, a second slider 50, a spring 60, a damper 62, a cam member 80, and an oil fence 90.

In the following description, the shape of each member of the hinge 100 will be described using the up and down direction, the front and back direction, and the right and left direction of the multifunctional machine 1 with the document pressing panel 3 closed with respect to the body 2 (when the rotation angle θ is 0°) (which correspond to the up and down direction, the front and back direction, and the right and left direction of the hinge 100, respectively).

The lower fastening member 10 is a first wing member according to an embodiment of the present invention. The lower fastening member 10 is fastened to the body 2 of the multifunctional machine 1.

The lower fastening member 10 of this embodiment is formed by appropriately bending a single metal plate. The lower fastening member 10 includes a bottom plate 11, right and left side plates 12, 12, and a back plate 13.

The bottom plate 11 is a plate-like member forming the bottom part of the lower fastening member 10. The bottom plate 11 has the top and bottom plate sides. The bottom plate 11 has a generally rectangular shape that is slightly elongated in the front and back direction in a plan view.

The side plates 12, 12 are plate-like members forming the right and left side parts of the lower fastening member 10. Each side plate 12 has a step-like shape that is lower in the front part in a side view. The lower edges of the side plates 12, 12 connect with edges of the bottom plate 11 (the bottom plate 11 and the side plates 12, 12 are formed by bending a single metal plate at right angles). Each side plate 12 has a through hole that accepts the first rotating pin 71 at the upper back position.

The back plate 13 is a plate-like member forming the back part of the lower fastening member 10. The back plate 13 has the front and back plate sides. The back plate 13 has a generally rectangular shape that is slightly elongated in the right and left direction in a front view.

The lower edge of the back plate 13 connects with the back edge of the bottom plate 11 (the bottom plate 11 and the back plate 13 are formed by bending a single metal plate at right angles).

The intermediate member 20 is an intermediate member according to an embodiment of the present invention. The intermediate member 20 is formed by appropriately bending a single metal plate, and includes a top plate and right and left side plates 21, 21. The intermediate member 20 houses the first slider 40, the second slider 50, the spring 60, the damper 62, and other parts, and is rotatably supported on the lower fastening member 10 with the first rotating pin 71, as described below. Each side plate 21 has a through hole that is formed at a back position in the right and left direction to accept the first rotating pin 71.

The first rotating pin 71 is "a rotating shaft of the second wing member with respect to the first wing member (a rotating shaft for rotatably coupling the second wing member to the first wing member) according to an embodiment of the present invention. The first rotating pin 71 is a generally cylindrical member.

The first rotating pin 71 is disposed in the through holes in the side plates 21, 21 of the intermediate member 20 and the through holes in the side plates 12, 12 of the lower fastening member 10. The intermediate member 20 is rotatably coupled to the lower fastening member 10 with the first rotating pin 71.

The upper fastening member 30 is a fastening member according to an embodiment of the present invention. The upper fastening member 30 is formed by appropriately bending a single metal plate, includes a top plate and right and left side plates 31, 31, and has a generally tubular shape. The upper fastening member 30 is rotatably supported on the intermediate member 20 with the second rotating pin 72, as described below. The upper fastening member 30 is also fastened to the document pressing panel 3.

The second rotating pin 72 is "a rotating shaft of the fastening member with respect to the intermediate member (a rotating shaft for rotatably coupling the fastening member to the intermediate member)" according to an embodiment of the present invention. The second rotating pin 72 is a member forming a rotating shaft for rotatably coupling the upper fastening member 30 to the intermediate member 20. The second rotating pin 72 is a generally cylindrical member and inserted in the front parts of the upper fastening member 30 and the intermediate member 20. As a result, the upper fastening member 30 is rotatably coupled to the intermediate member 20 with the second rotating pin 72.

The pressure receiving part 73 is a pressure receiving part according to an embodiment of the present invention. The pressure receiving part 73 is a member formed by bending a single generally T-shaped metal plate member and is fastened to the top plate of the upper fastening member 30 with a screw or the like. The pressure receiving part 73 includes a back plate part 73a, right and left side plate parts 73b, 73b, right and left fastening parts 73c, 73c, and a curved plate part 73d.

Each side plate part 73b is formed by bending the back plate part 73a. Each side plate part 73b has a through hole that accepts the second rotating pin 72.

Each fastening part 73c is formed by outwardly bending the end of the side plate part 73b. The fastening parts 73c, 73c are fastened to the top plate of the upper fastening member 30.

The curved plate part 73d is disposed closer to the back plate part 73a than to the through holes in the side plate parts 73b, 73b (opposite to the second rotating pin 72). The curved plate part 73d curves and backwardly projects from the back plate part 73a (toward the second slider 50) while its end is disposed between the side plate parts 73b, 73b. The end of the curved plate part 73d is fastened to the side plate parts 73b, 73b. The outer surface (facing the second slider 50) of the downwardly projecting curved part of the curved plate part 73d is configured to be a cam surface that comes into contact with a cam contact surface 52 of the second slider 50. The cam surface of the curved plate part 73d has a continuous curved surface with different curvatures.

If the cam surface of the curved plate part 73d has a curved surface with the curvature of a perfect circle (such as an outer surface of a cylinder), torque control depending on the rotation angle of the upper fastening member 30 with respect to the intermediate member 20 is difficult without changing some specifications other than those of the curved plate part 73d. The curved plate part 73d with the above configuration (the curved plate part 73d with this cam surface) enables torque control depending on the rotation angle of the upper fastening member 30 with respect to the intermediate member 20.

In addition, the pressure receiving part 73 formed by bending a single metal plate member reduces costs compared to a pin-like structure.

The first slider 40 is a sliding member according to an embodiment of the present invention. The first slider 40 of this embodiment is made of a resin material.

The first slider 40 includes a cam contact surface 41 on the back surface. The first slider 40 has a spring receiving hole that accepts the back end of the spring 60. The first slider 40 is housed in the back part of the intermediate member 20 so that the first slider 40 can slide in the front and back direction.

The second slider 50 is a sliding member according to an embodiment of the present invention. The second slider 50 of this embodiment is made of a resin material.

The second slider 50 includes the cam contact surface 52 on the front surface. The second slider 50 has a spring receiving hole that accepts the front end of the spring 60.

The bottom surface of the spring receiving hole of the second slider 50 has a pressing projection 53 projecting toward the first rotating pin 71. The pressing projection 53 presses a tip end 62a of the damper 62.

In this embodiment, "all of the intermediate member 20, the upper fastening member 30, the second slider 50, the second rotating pin 72, and the pressure receiving part 73" corresponds to the second wing member according to an embodiment of the present invention. In other words, the second wing member according to an embodiment of the present invention includes the intermediate member 20, the upper fastening member 30, the second slider 50, the second rotating pin 72, and the pressure receiving part 73. The second wing member is fastened to the second to-be-coupled object by fastening the upper fastening member 30 to the document pressing panel 3.

In this embodiment, when the second wing member is at the closest position to the first wing member, the second wing member is considered to be in "the closed state" (in which the document pressing panel 3 is closed with respect to the body 2). In the closed state, the rotation angle θ of the second wing member from the closed state with respect to the first wing member is 0°. When the second wing member is at the farthest position from the first wing member, the second wing member is considered to be in "the open state." In the open state, the document pressing panel 3 is open with respect to the body 2, and the rotation angle θ is 90°.

The spring 60 is an energizing member according to an embodiment of the present invention. The spring 60 is made of a metal spiral spring (a metal compressed spring). The spring 60 is housed in the intermediate member 20 (in the spring receiving holes in the first slider 40 and the second slider 50).

The back end of the spring 60 is inserted into the spring receiving hole in the first slider 40 to come into contact with the bottom surface of the spring receiving hole. The front end of the spring 60 is inserted into the spring receiving hole in the second slider 50 to come into contact with the bottom surface of the spring receiving hole.

Due to the energizing force of the spring 60, that is, the restoring force (the elastic force) generated when the spring 60, which has been elastically deformed in the compression direction, restores the original shape (the shape without any external force); the first slider 40 is energized toward the first rotating pin 71 in the longitudinal direction of the intermediate member 20, and the second slider 50 is energized toward the pressure receiving part 73 in the longitudinal direction of the intermediate member 20.

The damper 62 is housed in the spring receiving holes in the first slider 40 and the second slider 50. The body part of the damper 62 is fastened to the bottom part of the first slider 40, and the tip end 62a projects toward the second rotating pin 72. The damper 62 generates the reaction force when the pressing projection 53 of the second slider 50 presses the tip end 62a. Thus, the reaction force reduces the moving speed of the first slider 40, which causes the buffering effect of the damper 62. The damper 62 is a common fluid damper.

The cam member 80 is made of a resin material. The cam member 80 is fastened to the back plate 13 of the lower fastening member 10 with a screw or the like. The through hole in the upper back part of the cam member 80 accepts the first rotating pin. The upper back part of the cam member 80 has a cam surface 81 that comes into contact with the cam contact surface 41 of the first slider 40.

When the cam member 80 is mounted on the lower fastening member 10 and the second wing member is in the closed state, the cam contact surface 41 of the first slider 40 is in contact with the cam surface 81 of the cam member 80 and the cam contact surface 52 of the second slider 50 is in contact with the curved plate part 73d of the pressure receiving part 73.

As a result, due to the elastic force of the spring 60, the intermediate member 20 (the second wing member according to an embodiment of the present invention) is energized to rotate in the opening direction with respect to the lower fastening member 10, and the upper fastening member 30 is energized to rotate in the closing direction with respect to the intermediate member 20. At this time, the pressing projection 53 of the second slider 50 presses the tip end 62a of the damper 62 toward the body part.

In this embodiment, when the rotation angle θ of the second wing member from the closed state with respect to the first wing member is in a first region of 0° to a first predetermined angle φ1 (0°≤θ≤φ1), the second wing member is rotated in the opening direction with respect to the first wing member due to the elastic force of the spring 60. For example, the first predetermined angle φ1 is set at 60° (the rotation angle θ=the first predetermined angle φ1=60°). Note that the first predetermined angle φ1 may be different from 60°.

In this embodiment, the shapes of the cam contact surface 41 of the first slider 40 and the cam surface 81 of the cam member 80 are determined in advance so that the turning force in the closing direction of the hinge 100 due to the weight of the document pressing panel 3 fastened to the upper fastening member 30 generally equals the turning force in the opening direction of the hinge 100 due to the energizing force of the spring 60.

With this structure, the rotation angle θ remains the same in the range of 0° to φ1 of the rotation angle θ of the document pressing panel 3 with respect to the body 2 of the multifunctional machine 1 even if the document pressing panel 3 is released from an operator's hand.

Figure 8:
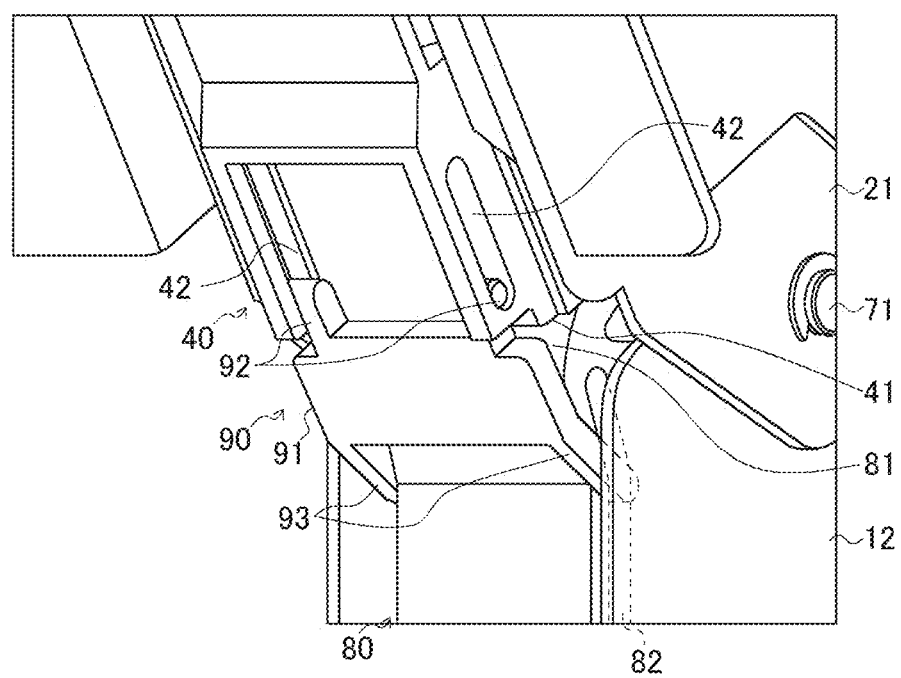
FIG. 8 is a perspective view of an area near an oil fence of the hinge.

The oil fence 90 is disposed near the cam surface 81 of the cam member 80 and in front of the cam surface 81 of the cam member 80 and the cam contact surface 41 of the first slider 40 (see FIG. 8). The oil fence 90 prevents the intrusion of a foreign matter (such as a document) into an area near the contact parts of the cam contact surface 41 of the first slider 40 and the cam surface 81 of the cam member 80 from the outside of the first slider 40 and the cam member 80, from the closed state to the open state of the intermediate member 20 (in the entire range of the rotation of the intermediate member 20). The oil fence 90 hides the cam surface 81 of the cam member 80 (the contact parts of the cam contact surface 41 of the first slider 40 and the cam surface 81 of the cam member 80) from the front outside and shields the area from the outside space.

The oil fence 90 is supported by the first slider 40 and the cam member 80 and configured to move along with the rotation of the intermediate member 20.

The oil fence 90 includes a body part 91, a pair of first arms 92, and a pair of second arms 93.

The body part 91 has a flat plate-like shape having a width greater than the cam member 80 (the cam surface 81) in the right and left direction.

The first arms 92 project from the body part 91 toward second rotating pin 72 and have an outward projection further in the right and left direction at the projected end.

The second arms 93 project from the body part 91 toward the lower fastening member 10 and have an outward projection in the right and left direction at the projected end.

The first slider 40 has first guiding parts 42.

The first guiding parts 42 are grooves (through grooves) in the right and left side surfaces of the first slider 40 and accept the projections of the first arms 92 of the oil fence 90 for guiding the movement of the oil fence 90.

The first guiding parts 42 are formed linearly in the flat plates of the first slider 40, which project on the right and left sides in a front view, along the moving direction of the first slider 40.

The cam member 80 includes second guiding parts 82.

The second guiding parts 82 are grooves (through grooves) in the right and left side surfaces of the cam member 80 and accept the projections of the second arms 93 of the oil fence 90 for guiding the movement of the oil fence 90.

The second guiding parts 82 extend upward from the bottom part of the cam member 80 and curve in the upper front direction near the cam surface 81.

As described above, the oil fence 90 is disposed near the cam surface 81 of the cam member 80 and in front of the cam surface 81 of the cam member 80 and the cam contact surface 41 of the first slider 40 (in front of the contact parts of the cam member 80 and the first slider 40), and prevents the intrusion of a foreign matter (such as a document) into an area near the contact parts of the cam contact surface 41 of the first slider 40 and the cam surface 81 of the cam member 80 from the outside of the first slider 40 and the cam member 80. Accordingly, the oil fence 90 reliably prevents the intrusion of a document placed on the top surface of the body 2 into an area near the contact parts of the cam contact surface 41 of the first slider 40 and the cam surface 81 of the cam member 80 and the resulting adhesion of the oil to the document, from the closed state to the open state of the second wing member.

In addition, the oil fence 90 hides the contact parts of the cam contact surface 41 of the first slider 40 and the cam surface 81 of the cam member 80 from the front outside, and shields the area from the outside space not to expose the cam surface 81 of the cam member 80 as much as possible. Accordingly, the oil fence 90 prevents the splash of the oil from the cam member 80 to the outside.

In addition, the oil fence 90 is supported by the first slider 40 and the cam member 80 and configured to move along with the rotation of the intermediate member 20. Accordingly, the oil fence 90 further reliably prevents the intrusion of a foreign matter into an area near the contact parts of the cam contact surface 41 of the first slider 40 and the cam surface 81 of the cam member 80.

Note that the structure of the oil fence 90 supported by the first slider 40 and the cam member 80 is not limited to this structure. For example, the first arms 92 of the oil fence 90 may have guiding grooves instead of the projections, and the first slider 40 may have projections instead of the first guiding parts 43, so that the oil fence 90 is supported by the first slider 40. For example, the second arms 93 of the oil fence 90 may have guiding grooves instead of the projections, and the cam member 80 may have projections instead of the second guiding parts 82, so that the oil fence 90 is supported by the cam member 80.

Figure 9:
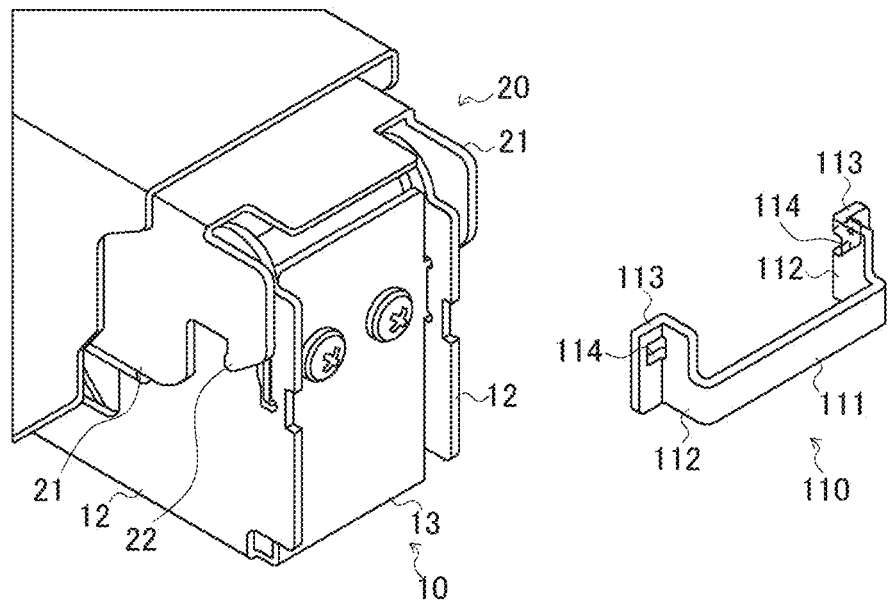
FIG. 9 is a perspective view of the hinge without a locking member.
Figure 10:
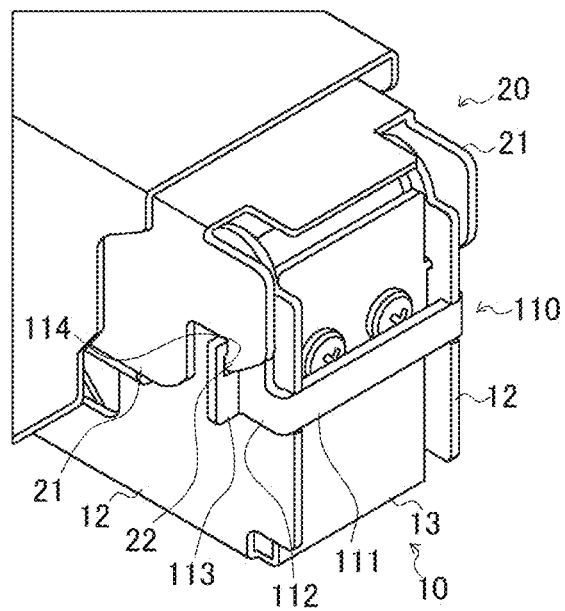
FIG. 10 is a perspective view of the hinge with the locking member mounted thereon.

As shown in FIGS. 9 and 10, a locking member 110 may be attached to the hinge 100.

The locking member 110 is attached to the lower fastening member 10 and the intermediate member 20 to keep the intermediate member 20 closed with respect to the lower fastening member 10.

The locking member 110 is formed by appropriately bending a single metal plate. The locking member 110 includes a back plate part 111, right and left side plate parts 112, 112, right and left projecting parts 113, 113, and an engaging hole 114.

The side plate parts 112, 112 are formed by bending the back plate part 111, and the projecting parts 113, 113 are formed by bending the ends of the side plate parts 112, 112. The engaging hole 114 is a through hole to be engaged with the intermediate member 20. The engaging hole 114 is formed from the boundary between the side plate part 112 and the projecting part 113 to the area near the outer end of the projecting part 113.

The intermediate member 20 includes an engaging hook 22.

The engaging hook 22 is a part to be engaged with the engaging hole 114 in the locking member at the time of the attachment of the locking member 110. The engaging hook 22 is cut into a generally U-shape to engage with the engaging hole 114 in the locking member 110 at the position opposite to the top plate of the side plate 21. The engaging hook 22 projects downward when the intermediate member 20 is closed with respect to the lower fastening member 10. The engaging hook 22 is disposed near the through hole that accepts the first rotating pin 71.

When the intermediate member 20 is closed with respect to the lower fastening member 10, the locking member 110 is moved from behind the back plate 13 of the lower fastening member 10 until the side plate parts 112, 112 are disposed outside the side plates 12, 12, which engages the engaging hole 114 with the engaging hook 22 of the intermediate member 20. If the intermediate member 20 is rotated from this state in the opening direction with respect to the lower fastening member 10, the back plate part 111 of the locking member 110 comes into contact with the back plate 13 of the lower fastening member 10, which keeps the intermediate member 20 closed with respect to the lower fastening member 10.

In this way, the locking member 110 formed by appropriately bending a single metal plate provides a simple structure that keeps the intermediate member 20 closed with respect to the lower fastening member 10.

The structure in which the locking member 110 is attached to the lower fastening member 10 and the intermediate member 20 is not limited to this structure. For example, the locking member 110 may have an engaging hook instead of the engaging hole 114, and the intermediate member 20 may have an engaging hole instead of the engaging hook 22. This structure also allows the attachment of the locking member 110 to the lower fastening member 10 and the intermediate member 20.

INDUSTRIAL APPLICABILITY

The present invention is applicable to a hinge that openably couples a second to-be-coupled object to a first to-be-coupled object, for example, a hinge that openably couples a document pressing panel of an office machine to the body of the office machine.

REFERENCE SIGNS LIST 1 multifunctional machine
2 body
3 document pressing panel
10 lower fastening member
20 intermediate member
30 upper fastening member
40 first slider
50 second slider
80 cam member
90 oil fence
100 hinge.

The invention claimed is:

1. A hinge for coupling with a first object and a second object, the hinge comprising:
- a first wing member capable of attaching to the first object;
- a cam member fastened to the first wing member;
- a second wing member that is capable of attaching to the second object and rotatably coupled to the first wing member with a first rotating pin, and shifts between an open state and a closed state with respect to the first wing member;
- first and second sliders that are housed in the second wing member and move toward the cam member and away from the cam member;
- an energizing member that energizes the first slider toward the cam member until the first slider comes into contact with the cam member; and
- an oil fence that is disposed near and outside a contact parts of the cam member and a contact part of the first slider that are contacting to each other, prevents intrusion of a foreign matter into an area near the contact parts of the first slider and the cam member from outside of the first slider and the cam member, from the closed state to the open state of the second wing member, and one end of the oil fence being inserted into a groove defined in the first slider and configured to move along the groove with rotation of the second wing member.

2. The hinge according to claim 1, wherein
- the second wing member includes an intermediate member rotatably coupled to the first wing member with the first rotating pin, a fastening member fastened to the second object and rotatably coupled to the intermediate member with a second rotating pin, and a pressure receiving part fastened to the fastening member;
- the energizing member energizes the second slider toward the pressure receiving part until the second slider comes into contact with the pressure receiving part; and
- a part of the pressure receiving part to be in contact with the second slider has a continuous curved surface with different curvatures.

* * * * *